United States Patent Office 3,772,423
Patented Nov. 13, 1973

---

3,772,423
HYDROMETALLURGICAL RECOVERY OF METAL VALUES
Laurence G. Stevens, Marilyn Miller, and Leonhard A. Goeller, Des Plaines, Ill., assignors to Universal Oil Products Company, Des Plaines, Ill.
No Drawing. Continuation-in-part of abandoned application Ser. No. 211,069, Dec. 22, 1971. This application June 19, 1972, Ser. No. 263,891
Int. Cl. C01g 53/06, 53/12
U.S. Cl. 423—144                          7 Claims

ABSTRACT OF THE DISCLOSURE

In the hydrometallurgical recovery of metal values from ores and the like, the method of improving subsequent extraction with ammonium carbonate solution which comprises effecting a reducing step by means of a reducing gas at a temperature of from about 1000° to about 1800° F. in contact with added gaseous sulfur compound and added sulfur and/or added hydrogen halide.

CROSS-REFERENCE TO RELATED APPLICATION

This is a continuation-in-part of copending application Ser. No. 211,069, filed Dec. 22, 1971 and now abandoned.

BACKGROUND OF THE INVENTION

In the processing of materials containing metal values two of the main extractive methods of primary interest are pyrometallurgy and hydrometallurgy. The usual pyrometallurgical process is accomplished by heating the metal-containing material to the melting or fusion point of the mixture. The temperature is of the order of 2000° to 3000° F., at which temperature there is a separation of metallic values from gangue or waste materials and separation thereof is effected at a temperature at which these are molten. An advantage to this method is that recoveries of the metal values are typically quite high. However, a major disadvantage is the requirement of high temperatures which, in turn, requires the use of expensive processing equipment including special furnaces, special high temperature separation equipment, etc.

The hydrometallurgical process differs substantially from pyrometallurgical processing in that much lower temperatures are utilized, which temperatures are well below the fusion point of the metal-containing material and typically may be within the range from about 500° to about 1900° F. Following the reducing treatment, the metal values are recovered by extraction with an appropriate aqueous solution and the metal is removed from the solution by precipitation, solvent extraction, evaporation of solvent, etc. Although the temperature conditions in the hydrometallurgy approach are much lower than in pyrometallurgy, generally the recovery of metal values is also lower.

A particular case where this is true concerns the extraction of nickel from lateritic nickel ores. The pyrometallurgical processes range from the use of an electric furnace for the direct smelting of ore to produce ferronickel through similar techniques involving the blast furnace in which an iron-nickel-sulfide matte is obtained. The extraction of nickel from the ore using this method is greater than 90%.

Of the several hydrometallurgy approaches used commercially for treating this type of ore, the practice on a highly serpentinic ore, such as at Nicaro, Cuba, involves roasting the ore in a multihearth furnace while a reducing gas, such as producer gas, passes countercurrent to the ore. Temperatures in this case range from about 900° F. to about 1350° F. Following the roasting step, the ore is cooled in the absence of air, mixed with an ammoniacal ammonium carbonate solution and vigorously agitated and aerated. This results in the dissolution of nickel and cobalt, separating them from the bulk of the ore. This solution then is treated with steam, driving off ammonia and precipitating nickel carbonate. This product then is treated further to obtain the appropriate form of nickel or used as such. In comparison to the pyrometallurgical process, however, extractions using this method have only been of the order of 70 to 80 percent.

It recently has been found by one of the present applicants that improved extraction of metal values is obtained in the hydrometallurgical system when the reductive roast is effected in the presence of added sulfur. It also has recently been found by the present applicants that improved extraction is obtained when the reductive roast is effected in the presence of added hydrogen halide or with mixtures of the added sulfur and added hydrogen halide. While these recent improvements considerably increase the recovery of metal values, it still is desirable to provide other methods for effecting improved recovery of metal values, as well as means to even further increase such recoveries.

DESCRIPTION OF THE INVENTION

In accordance with the present invention, hydrometallurgical extraction of metal values is improved when a reductive roast is effected in the presence of added gaseous sulfur compound and added solid sulfur and/or added hydrogen halide. The exact reasons for these improved results or the mechanism by which they are accomplished are not known but several explanations therefor may be offered, with the understanding that applicants do not intend to be limited thereto. One explanation is that the additives may act to reduce or to facilitate reduction of the combined metal or to otherwise assist in liberating the metal, whereby it is readily extractable. Another explanation is that the combination of additives may act or facilitate such action to reduce the nickel in an iron-nickel alloy to thereby convert the nickel into a readily extractable form. Still another explanation is that the combination of additives may act to prevent recombination of the metal into a form in which it is not readily extractable. Regardless of the reasons therefor, improved extraction is obtained in the processing of certain ores as will be illustrated in the appended examples.

It is recognized that different ores respond differently to different additives and that greater improvement in the recovery of metal values may be obtained with some ores when the roasting is conducted in contact with a mixture of added gaseous sulfur compound and added sulfur or in contact with added gaseous sulfur compound and added hydrogen halide or when the roasting is effected in contact with all three of these additives. Also, it is recognized that some added gaseous sulfur compounds will respond differently in this system than other added gaseous sulfur compounds. Accordingly, the specific added gaseous sulfur compound and added sulfur and/or added hydrogen halide will be selected with reference to the particular ore to be processed.

As hereinbefore set forth, improved recovery of metal values is obtained when the roasting of the metal-containing material such as ore, slag, scrap, etc., is effected in contact with added gaseous sulfur compound and added solid sulfur and/or added hydrogen halide. This improvement results in recoveries considerably higher than heretofore obtained in the hydrometallurgical system. As hereinbefore set forth, such metal recoveries are considerably improved with certain ores as will be demonstrated in the appended examples. The process can be effected in unusually short times. High recoveries were obtained in roasting times of 30 minutes, which is in contrast to the typical requirements of greater than 1 hour in prior processes. However, in some cases, longer roast times can be used to advantage in the process of the present invention.

It is believed that the improved recovery of metal values may be due to a synergistic effect occurring through the interrelated activity of the combination of additives in contact with the conventional reducing gases. Still another important advantage to the present invention is that nickel ores of low iron content may be processed economically in the hydrometallurgical method. Heretofore the low iron garnieritic type ores could be processed satisfactorily only in the pyrometallurgical method.

The improved process of the present invention may be used for the recovery of metal values from ore, slag, scrap or other metal bearing sources. In the interest of brevity, it is understood that reference to ore in the present specifications and claims also includes slag, scrap, or other suitable metal bearing sources. The improved process of the present invention is particularly applicable to the recovery of nickel from such sources. However, it is understood that the process may be used for the recovery of other metal values including, for example, cobalt, copper, manganese and other metals soluble in ammoniacal ammonium carbonate solutions, but not necessarily with equivalent results. In the interest of brevity, the following discussion will be directed to the recovery of nickel, with the understanding that it may be applied to the recovery of other metals as hereinbefore set forth.

As another advantage to the present invention, the process may be conducted in conventional apparatus and may utilize much of the conventional steps of prior art processes. Accordingly, the ore such as a lateritic nickel ore or other metal bearing source is prepared in a manner suitable for the process, such as finely divided or comminuted particles in a conventional way. The particles may be within a size range of from about 8 mesh to about 500 mesh or smaller and preferably within a range of from about 48 mesh to about 200 mesh. The particles then preferably are dried in a conventional manner to lower the moisture content of from about the usual 25% to 50% down to about 8% to 10% or less. The drying generally is effected in a rotary kiln at conventional temperatures.

The added gaseous sulfur compound will be used in a sufficient concentration for the purpose and may be within the range of from about 0.01% to about 10% and preferably from about 0.1% to about 5% by weight of the ore. Any suitable gaseous sulfur compound may be used in the present invention. Preferred gaseous sulfur compounds comprise hydrogen sulfide, sulfur dioxide, sulfur trioxide, carbonyl sulfide, carbon monosulfide, carbon disulfide, etc. For ease of use, the added gaseous sulfur compound preferably is normally gaseous. However, in another embodiment it may be normally liquid and vaporized prior to use or allowed to vaporize under the conditions existing in the reducing zone. In another embodiment the added sulfur compound is a hydrocarbyl sulfide including, for example, methyl mercaptan, ethyl mercaptan, propyl mercaptan, butyl mercaptan, pentyl mercaptan, hexyl mercaptan, etc. but generally containing not more than about 20 carbon atoms per molecule.

The gaseous sulfur compound may be supplied to the reducing zone in any suitable manner. When as a gas or vapor, it may be charged directly into the reducing zone. In another method a solution, preferably aqueous, of the sulfur compound may be prepared, and the reducing gas bubbled therethrough to carry the sulfur compound into the reducing zone. When the added sulfur compound is normally liquid, the reducing gas may be bubbled therethrough or through a solution thereof in a suitable solvent or the liquid may be charged directly into the reducing zone. In still another method the ore may be contacted with the sulfur compound prior to being introduced into the reducing zone. It is understood that these different methods are not necessarily equivalent and that the preferred method will be selected with regard to the particular system being employed. It is also understood that a mixture of the gaseous sulfur compounds may be employed.

In one embodiment, the reducing treatment is effected in the presence of the added gaseous sulfur compound and added sulfur. When employed, the sulfur may be in solid form, including powder, flour, granules, pellets, etc. or as molten or otherwise liquefied sulfur, or as sulfur vapors. Advantageously, the sulfur is mixed with the ore at an elevated temperature, which preferably is within the range of from about 500° to about 1200° F. and conveniently is accomplished by mixing the sulfur at the elevated temperature of the particles being withdrawn from the drying step.

The sulfur generally is employed in a concentration of from about 0.01% to about 5% and preferably from about 0.15% to about 3% by weight of the ore. It is understood that any suitable means of introducing the sulfur into the reducing zone may be utilized.

In another embodiment, the gaseous sulfur compound is used in combination with added hydrogen halide. The hydrogen halide is used in a concentration of from about 0.01% to about 10% and preferably from about 0.1% to about 5% by weight of the ore. Any hydrogen halide gas may be used and preferably comprises hydrogen chloride or hydrogen bromide. Hydrogen iodide or hydrogen fluoride may be employed but not necessarily with equivalent results. The hydrogen halide is supplied to the reducing zone in any suitable manner and conveniently in one of the methods hereinbefore described for the introduction of the gaseous sulfur compound. In still another embodiment a precursor of hydrogen halide is utilized and may be selected from the free halogen chlorine, bromine, iodine, fluorine, or suitable compounds selected from boron halides, carbon halides, phosphorus halides, silicon halides, etc. or, in still another embodiment, the precursor may comprise a hydrocarbon halide which preferably contains not more than about 20 carbon atoms per molecule. It is understood that a mixture of hydrogen halides and/or precursor compounds may be employed.

The gaseous sulfur compound and added hydrogen halide may be introduced separately into the reducing zone or they may be supplied in admixture thereto. In one method, the reducing gases are bubbled through a suitable hydrogen halide solution, then gaseous sulfur dioxide, hydrogen sulfide or other gaseous sulfur compound added thereto, and the reducing gases containing both added components are charged to the reducing zone. As hereinbefore set forth, any suitable method of introducing these components may be employed and will be selected to suit the arrangement of the particular system being utilized.

As hereinbefore set forth, the ore particles preferably are dried prior to roasting. The dried particles then are supplied to a suitable reducing zone which, here again, may be of conventional design but modified to provide means for the introduction of the gaseous sulfur compound and sulfur and/or hydrogen halide. Conventional reducing zones include, for example, multiple hearth furnace, fluosolids roaster, Herreshoff furnace, etc.

The chemical reduction of the ore is effected by means of a suitable reducing gas mixture which, here again, is of the general type used in conventional processes. Any suitable reducing gas mixture may be used and preferably comprises a mixture of hydrogen, carbon monoxide, carbon dioxide and water vapor. The gas mixture may come from any suitable source, including producer gas, gases formed by the combustion of city gas, gases formed by combustion of oil, etc. The specific gas mixture will be selected to effect the desired reduction. An illustrative gas mixture comprises a $CO:CO_2$ ratio within the range of about 0.1:1 to 10:1, a $CO:H_2$ ratio of about 0.1:1 to 10:1 and a $H_2:H_2O$ vapor ratio of about 0.1:1 to 10:1, all being on a volumetric basis. In one embodiment, it is desirable to maintain the gas mixture within the ratios set forth above because an excessive concentration of one or more of the components in the gas mixture may have undesired effects such as, for example, incomplete reduction of the metal compound, excessive adsorption of the gas in the ore particles, etc. It is understood that the gas mixture may contain other components as, for example, nitrogen, when advantages appear therefor. Another illustrative gas mixture comprises hydrogen, nitrogen and water vapor. Still another gas mixture may comprise natural gas.

As hereinbefore set forth, the reduction of the metal compounds to the free metal is effected at a temperature of from about 1000° to about 1800° F. and preferably from about 1200° to about 1600° F. The low temperature utilized in the reduction avoids the objections inherent in the prior art high temperature reduction processes. Also, as hereinbefore set forth, the reduction is effected in a short time and this further constitutes another advantage to the novel method of the present invention.

For economical reasons and/or for abatement of disposal problems, the gaseous sulfur compound and/or hydrogen halide preferably are reused and this may be accomplished in any suitable manner. Conveniently, this is effected by recycling the gases withdrawn from the reducing zone, accompanied by further heating when desired. In another embodiment the gases leaving the reducing zone may be suitably treated as, for example, by adsorption on a solid adsorbent and desorption with a suitable desorbing gas, absorption in a suitable solvent and then released by stripping, flashing or other suitable method, or in any other suitable manner to recover these components for recycling within the system.

The reduced ore particles are withdrawn from the reducing zone and then processed in conventional manner for the hydrometallurgical extraction of the nickel. The effluent from the reduction zone is first cooled several hundred degrees and then is passed into one or more quench zones. In a preferred embodiment the quench liquid is the ammonium carbonate leaching solution. However, the quenching must be effected in the absence of air. In other words, oxygen or air should not contact the reduced particles until the temperature of the particles is below about 200° F. because of the possibility of oxidation of the metal to the oxide or to other oxygen containing compounds. It is understood that other suitable quenching solutions may be employed but, as hereinbefore set forth, economical advantages appear for the use of the leaching solution.

Any suitable leaching solution may be employed and preferably comprises aqueous ammonium carbonate solution containing from about 2% to about 25% and preferably from about 3% to about 15% $NH_3$ and from about 1% to about 15% and preferably from about 1.5% to about 7.5% $CO_2$. As still another advantage to the process of the present invention, the leaching solution comprises a lower concentration of $NH_3$ than generally is utilized in the prior art, thus effecting an additional economy in the present process. The leaching is effected at a temperature below 200° F. and conveniently ambient temperature. Ambient pressure or superatmospheric pressure may be used but generally will not exceed about 100 p.s.i.g. As hereinbefore set forth, the leaching is effected in the presence of oxygen, which may comprise ambient air when the leaching is effected in open tanks or vessels or it may comprise air introduced into closed zones. It is understood that, in the place of air, oxygen or other suitable oxygen containing source may be utilized.

As hereinbefore set forth, the reduction in the presence of the added gaseous sulfur compound and sulfur and/or hydrogen halide facilitates extraction of the nickel, and particularly separation thereof from iron or iron compounds. Also, it appears that the combination of these additives helps in the separation of nickel from cobalt in the leaching solution. The extraction is effected in any suitable manner, and generally by passing the ore countercurrently to the leaching solution in a plurality of leaching and thickening zones.

The solution of nickel withdrawn from the leaching and thickening zones is then treated in any suitable manner to precipitate the nickel and to recover the same. In one method, this is accomplished by steaming to precipitate the nickel carbonate and to volatilize off ammonia, $CO_2$ and water. As hereinbefore set forth, the use of the combination of the additives of the present invention affords recoveries of nickel greater than obtained when the reduction of the ore is effected in the absence of added agents. Still further, low iron content ores may be treated economically to recover nickel therefrom, in contrast to the former requirement of using the higher temperature pyrometallurgical process or in not being able to effect such recovery economically.

The following examples are introduced to illustrate further the novelty and utility of the present invention but not with the intention of unduly limiting the same.

Example I

A series of experimental runs was made in the following manner. These runs were made with a Philippine lateritic nickel ore having the following assay:

TABLE I

| | Percent |
|---|---|
| Ni | 1.38 |
| Fe | 15.4 |
| MgO | 11.0 |
| $SiO_2$ | 38.0 |

In each run, 25 grams of the ore were weighed into a tared ⅞" I.D. quartz combustion tube, purged with reducing gas to eliminate any oxygen which may have been contained in the tube, and then placed into a split tube furnace at a temperature of 900° F. A reducing gas was passed over the sample, while the temperature was increased to 1500° F. over a period of 30 minutes. The gas composition was as follows:

TABLE II

| Gas: | C.F.M. |
|---|---|
| CO | .0125 |
| $H_2$ | .0125 |
| $N_2$ | .05 |
| $CO_2$ | .025 |
| $H_2O$ | [1] 3.5 |

[1] Grams.

In the control run, made without added gaseous sulfur compound, the reducing gas was passed through a bubbler to add water vapor and then charged directly into the combustion tube. In the runs made with sulfur dioxide, the reducing gas after leaving the bubbler was mixed with a stream of $SO_2$ gas prior to being charged to the combustion tube. About 0.01 c.f.m. (cubic feet per minute) of $SO_2$ gas aws added to the reducing gas stream which itself was at a rate of about 0.08 c.f.m.

When the temperature in the reducing zone reached 1500° F., the gas mixture was replaced by a flow of only $CO_2$ diluted with nitrogen, and the tube cooled to room temperature. The reduced ore then was weighed, transferred in a nitrogen atmosphere and slurried with 200 mls. of an ammoniacal ammonium carbonate solution. The slurry was agitated vigorously at ambient temperature for 2½ hours and filtered. The filtrate then was assayed for nickel content to determine the percent extraction.

The results of a control run (no added $SO_2$) and a run made with $SO_2$ added as described above are reported in the following table:

TABLE III

| $SO_2$: | Percent Ni extraction |
|---|---|
| No | 48.6 |
| Yes | 70.7 |

From the above data, it will be noted that the added $SO_2$ considerably increased the nickel recovery. However, as will be shown in subsequent examples, this recovery is even further improved when utilizing the $SO_2$ in combination with sulfur and/or hydrogen halide.

Example II

As hereinbefore set forth, even further improvement is obtained when both $SO_2$ and sulfur are added to the reducing step. The following table reports the results of evaluations made in the same manner as described in Example I, with the same ore, but using both $SO_2$ and sulfur. The sulfur powder was physically mixed with the ore particles at room temperature prior to the reducing treatment. For comparison purposes, the run made with added sulfur but no $SO_2$ also is included in the following table:

TABLE IV

| $SO_2$ | Sulfur, percent | Percent Ni extraction |
|---|---|---|
| No | 1 | 86.2 |
| Yes | 1 | 94.8 |

It will be noted that the addition of sulfur increased the recovery to 86.2%. However, the addition of both $SO_2$ and the sulfur increased the recovery to 94.8%. As hereinbefore set forth, this high recovery apparently is due to a synergistic effect between the $SO_2$ and sulfur in contact with the reducing gas.

Example III

Another series of runs were made using both added $SO_2$ and added hydrogen chloride. In this run, the reducing gas was first bubbled through an aqueous hydrogen chloride solution, then $SO_2$ added and the reducing gas containing both additives was charged to the reducing zone. For comparison purposes, the run made with the added hydrogen chloride but no $SO_2$ also is reported in the following table. The hydrogen chloride is believed to be in a concentration of about 4% by weight of the ore.

TABLE V

| $SO_2$ | HCl | Percent Ni extraction |
|---|---|---|
| No | Yes | 73.5 |
| Yes | Yes | 89.9 |

Herein again, it will be noted that the use of both the added $SO_2$ and added HCl considerably increased the nickel recovery.

Example IV

A similar series of evaluations was made on a different Philippine lateritic nickel ore sample which had an iron content of 7.2% by weight. This ore sample had the following assay:

TABLE VI

| | Percent |
|---|---|
| Ni | 1.45 |
| Fe | 7.2 |
| MgO | 25.9 |
| $SiO_2$ | 36.8 |

The results of runs using added $SO_2$ and added sulfur and using added $SO_2$ and added HCl are reported in the following table. The sulfur is in a concentration of about 1% by weight of the ore and the HCl is in a concentration of about 4% by weight of the ore.

TABLE VII

| $SO_2$ | Sulfur | HCl | Percent Ni extraction |
|---|---|---|---|
| No | No | No | 35.8 |
| Yes | Yes | No | 95.5 |
| Yes | No | Yes | 94.2 |

It will be noted that the use of the added $SO_2$ with either the added sulfur or the added HCl increased the nickel recovery to about 95% by weight. This is a considerable improvement, particularly with an ore of low iron content.

Example V

The ore having the assay as described in Example I is subjected to reduction in contact with reducing gas, 0.5% by weight of added $SO_2$, 0.5% by weight of added sulfur and 1% by weight of added HCl gas, all of said concentrations being percent by weight of the ore. The reduction is effected at a maximum temperature, in this case, of 1400° F. and for a total time of 25 minutes. Following the reducing treatment and cooling of the ore to room temperature, the reduced ore is extracted with ammoniacal ammonium carbonate solution to recover the nickel value in a concentration of above 90% by weight.

Example VI

A sample of oxidized copper ore having a copper content of 1.16% by weight was leached in an ammoniacal solution under oxidizing conditions with agitation for a period of 2.5 hours, with the copper being extracted from the ore to the extent of about 45% by weight. However, when the ore is subjected to a roasting treatment as herein described with reducing gases and added $SO_2$ and added HCl, extraction with the ammoniacal solution will result in extraction of the copper to an extent in excess of 88% by weight.

Example VII

Slag from copper melting furnace is subjected to a reductive roast in contact with reducing gases and added hydrogen sulfide and added hydrogen chloride at a temperature of about 1350° F. for about 20 minutes. The slag is partly cooled and slurried with ammoniacal leach solution under oxidizing conditions for 2.5 hours. Visual observation of the deep blue color confirms the improved extraction of the copper from the slag.

We claim as our invention:

1. A method of recovering nickel from a nickel bearing source which comprises subjecting said nickel bearing source to a reducing treatment with a reducing gas at a temperature of from about 1000° to about 1800° F. in contact with added gaseous sulfur compound in a concentration of from about 0.01% to about 10% by weight of said source in combination with added elemental sulfur in a concentration of from about 0.01% to about 5% by weight of said source or added hydrogen halide in a concentration of from about 0.01% to about 10% by weight of said source, and then extracting nickel from the thus reduced material with ammonium carbonate solution.

2. The method of claim 1 in which said nickel bearing source is nickel bearing ore.

3. The method of claim 1 in which said gaseous sulfur compound is $SO_2$.

4. The method of claim 1 in which said gaseous sulfur compound is hydrogen sulfide.

5. The method of claim 2 in which said reducing treatment is effected in contact with added gaseous sulfur compound in a concentration of from about 0.1% to about 5% by weight of said ore and added sulfur in a concentration of from about 0.15% to about 3% by weight of said ore.

6. The method of claim 2 in which said reducing treatment is effected in contact with added gaseous sulfur compound in a concentration of from about 0.1% to about 5% by weight of said ore and added hydrogen chloride in a concentration of from about 0.1% to about 5% by weight of said ore.

7. The method of claim 2 in which said reducing treatment is effected in contact with added gaseous sulfur compound in a concentration of from about 0.1% to about 5% by weight of said ore, added sulfur in a concentration of from about 0.15% to about 3% by weight of said ore and added hydrogen chloride in a concentration of from about 0.1% to about 5% by weight of said ore.

References Cited

UNITED STATES PATENTS

| | | | |
|---|---|---|---|
| 3,232,750 | 2/1966 | Wesalowski et al. | 75—103 X |
| 2,478,942 | 8/1949 | Queneau et al. | 75—103 X |
| 3,100,700 | 8/1963 | Hills | 75—103 X |
| 3,453,101 | 7/1969 | Takahashi et al. | 75—119 X |

FOREIGN PATENTS

| | | | |
|---|---|---|---|
| 765,348 | 8/1967 | Canada | 75—103 |

HERBERT T. CARTER, Primary Examiner

U.S. Cl. X.R.

423—143, 150; 75—103, 119